US012610897B2

(12) United States Patent
Burgess

(10) Patent No.: US 12,610,897 B2
(45) Date of Patent: Apr. 28, 2026

(54) SMART PLANT MONITORING AND DELIVERY SYSTEM FOR MAINTAINING HEALTHY VEGETATION

(71) Applicant: Root Matter LLC, Windsor, CO (US)

(72) Inventor: Craig Lee Burgess, Windsor, CO (US)

(73) Assignee: Root Matter LLC, Windsor, CO (US)

( * ) Notice: Subject to any disclaimer, the term of this patent is extended or adjusted under 35 U.S.C. 154(b) by 26 days.

(21) Appl. No.: 18/784,425

(22) Filed: Jul. 25, 2024

(65) Prior Publication Data

US 2025/0040493 A1 Feb. 6, 2025

Related U.S. Application Data

(60) Provisional application No. 63/530,103, filed on Aug. 1, 2023.

(51) Int. Cl.
| | |
|---|---|
| *A01G 9/26* | (2006.01) |
| *A01G 9/24* | (2006.01) |
| *A01G 25/16* | (2006.01) |

(52) U.S. Cl.
CPC .............. *A01G 9/247* (2013.01); *A01G 9/26* (2013.01); *A01G 25/165* (2013.01)

(58) Field of Classification Search
CPC ......... A01G 9/247; A01G 9/26; A01G 25/165
See application file for complete search history.

(56) References Cited

U.S. PATENT DOCUMENTS

| | | | | | |
|---|---|---|---|---|---|
| 4,678,554 | A | * | 7/1987 | Oppitz | E02D 3/106 |
| | | | | | 204/290.11 |
| 2018/0007845 | A1 | * | 1/2018 | Martin | A01G 9/249 |
| 2019/0357458 | A1 | * | 11/2019 | Cordoba | A01G 31/06 |
| 2021/0007307 | A1 | * | 1/2021 | Adams | G06Q 50/06 |
| 2022/0408672 | A1 | * | 12/2022 | Smith | A01G 9/02 |
| 2023/0084525 | A1 | * | 3/2023 | Massey | A01G 9/0293 |
| | | | | | 47/60 |

* cited by examiner

*Primary Examiner* — Kimberly S Berona
*Assistant Examiner* — Steven J Shur
(74) *Attorney, Agent, or Firm* — Bridget A. Cochran; Cochran Freund & Young LLC

(57) ABSTRACT

Disclosed is a smart plant monitoring and delivery system that monitors and maintains the health of various vegetation. The smart plant monitoring and delivery system comprises a monitoring and delivery system having a groove and protruding lip that conforms to the shape of a shovel for easy installation into soil.

23 Claims, 14 Drawing Sheets

SMART PLANT MONITORING AND DELIVERY SYSTEM FOR MAINTAINING HEALTHY VEGETATION

CROSS-REFERENCE TO RELATED APPLICATIONS

The present application is based upon and claims the benefit of U.S. provisional application Ser. No. 63/530,103, filed Aug. 1, 2023, entitled "Smart Plant Monitoring and Delivery System for Maintaining Healthy Vegetation" all of which is also specifically incorporated herein by reference for all that it discloses and teaches.

BACKGROUND

Planting and maintaining healthy vegetation, such as, but not limited to, houseplants, trees, bushes, and crops is important for many homes, businesses, farmers, and general appearance of landscape. Having a system that monitors vegetation is very beneficial and convenient for both planting and maintaining healthy vegetation.

SUMMARY

An embodiment of the present invention may therefore comprise: a smart plant monitoring and delivery system comprising: at least one smart delivery system comprising: a root monitoring and delivery system and a delivery system controller, the root monitoring and delivery system comprising: a housing comprising: a top, a bottom, an exterior side, and a root side so that the root side is separated from the exterior side by a width defining an internal chamber, and the exterior side extending from the top to the bottom, and the root side having a sidewall that extends from the top to a bottom of the sidewall, and the bottom of sidewall extends in a lateral direction towards the exterior side; mesh located on the root side and connected to the bottom of the sidewall and separated laterally from the exterior side by the width and defining an aeration chamber, the mesh extending from the bottom of the sidewall to an inner bottom wall of the housing, and the internal bottom wall extends in a lateral direction from the root side; a bottom sidewall on the root side that extends below the mesh; a housing extension that extends laterally from the bottom sidewall; a protruding lip that extends in a vertical direction from the housing extension so that the housing extension defines a lateral groove between the protruding lip and the bottom sidewall; an irrigation drip nozzle having a water intake end and a delivery end, the delivery end disposed through the top of the housing in an irrigation drip channel located between the sidewall of the root side of housing and the exterior side of the housing; a water control valve; a water delivery tube connected to the valve; at least one signal transmission cable connected to the valve; at least one sensor; the delivery system controller comprising: a battery; a processor that is powered by the battery, and the processor is connected to the at least one sensor, and the at least one signal transmission cable is connected to the processor, and the at least one signal transmission cable is configured to send signals from the processor to the water control valve and the signals are configured to turn on and off the water control valve; a waterproof housing that contains the processor and the battery; a main control system configured to wirelessly communicate with the smart delivery system, and the main control system comprising: a computer device; a controller configured to wirelessly communicate with the computer device and the delivery system controller, so that the controller is configured to control the water central valve, and the controller is configured to receive information from the sensors and send an alert to the computer device.

An embodiment of the present invention may further comprise: a method of installing a smart plant monitoring and delivery system comprising: creating a crescent opening in soil near roots of a plant by inserting a shovel head in the soil and rocking the shovel head in a back and forth motion; providing a root monitoring and delivery system shaped to fit the contour of the shovel head; partially lift the shovel head out of the soil in an upwards direction; pushing a top of the root monitoring and delivery system against a back contour of the shovel while shovel remains in the soil; inserting the shovel head in a groove located on the root monitoring and delivery system located between a protruding lip and a bottom sidewall of the root monitoring and delivery system while the shovel head and the root monitoring and delivery system remain in the soil; apply force to the groove with the shovel head until only the top of the root monitoring and delivery system is visible above soil; providing a delivery system controller having a battery connected to a processor inside of a waterproof housing; attaching the delivery system controller to the top of the root monitoring and delivery system; providing a controller independent of and not attached to the delivery system controller or the root monitoring and delivery system; providing a computer device independent of and not attached to the delivery system controller or the root monitoring and delivery system; attaching a water supply conduit to a water intake end of an irrigation drip line nozzle.

An embodiment of the present invention may further comprise: a root monitoring and delivery system comprising: a housing comprising: a top, a bottom, an exterior side, and a root side so that the root side is separated from the exterior side by a width defining an internal chamber, and the exterior side extends from the top to the bottom, and the root side having a sidewall that extends from the top to a bottom of the sidewall, and the bottom of sidewall extends in a lateral direction towards the exterior side; mesh located on the root side and connected to the bottom of the sidewall and separated laterally from the exterior side by the width and defining an aeration chamber, the mesh extending from the bottom of the sidewall to an inner bottom wall of the housing, and the internal bottom wall extends in a lateral direction from the root side; a bottom sidewall on the root side that extends below the mesh; a housing extension that extends laterally from the bottom sidewall; a protruding lip that extends in a vertical direction from the housing extension so that the housing extension defines a lateral groove between the protruding lip and the bottom sidewall; an irrigation drip nozzle having a water intake end and a delivery end, the delivery end disposed through the top of the housing in an irrigation drip channel located between the sidewall of the root side of housing and the exterior side of the housing.

An embodiment of the present invention may further comprise: a method of making a root monitoring and delivery system comprising: forming a housing having a root side and an exterior side separated by a width that forms an internal chamber inside of the housing so that the exterior side extends from a top of the housing to a bottom of the housing, and the root side has a sidewall formed that extends from the top of the housing to a bottom of the sidewall of the housing; shaping a mesh design in the root side of the housing that extends from the bottom of the sidewall of the root side of the housing to an internal bottom wall of the bottom of the housing; forming a groove below the mesh and between a bottom sidewall of the root side of the housing and a protruding lip so that the groove is formed by a housing extension that extends laterally away from the bottom sidewall, and the groove is formed at the bottom of the housing; shaping the root side, the exterior side, the groove and the lip in a curved shape so that the groove, the protruding lip and the root side of the housing are contoured to the shape of a shovel head and the root monitoring and delivery system is shaped to be held by the shovel head.

DETAILED DESCRIPTION OF THE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
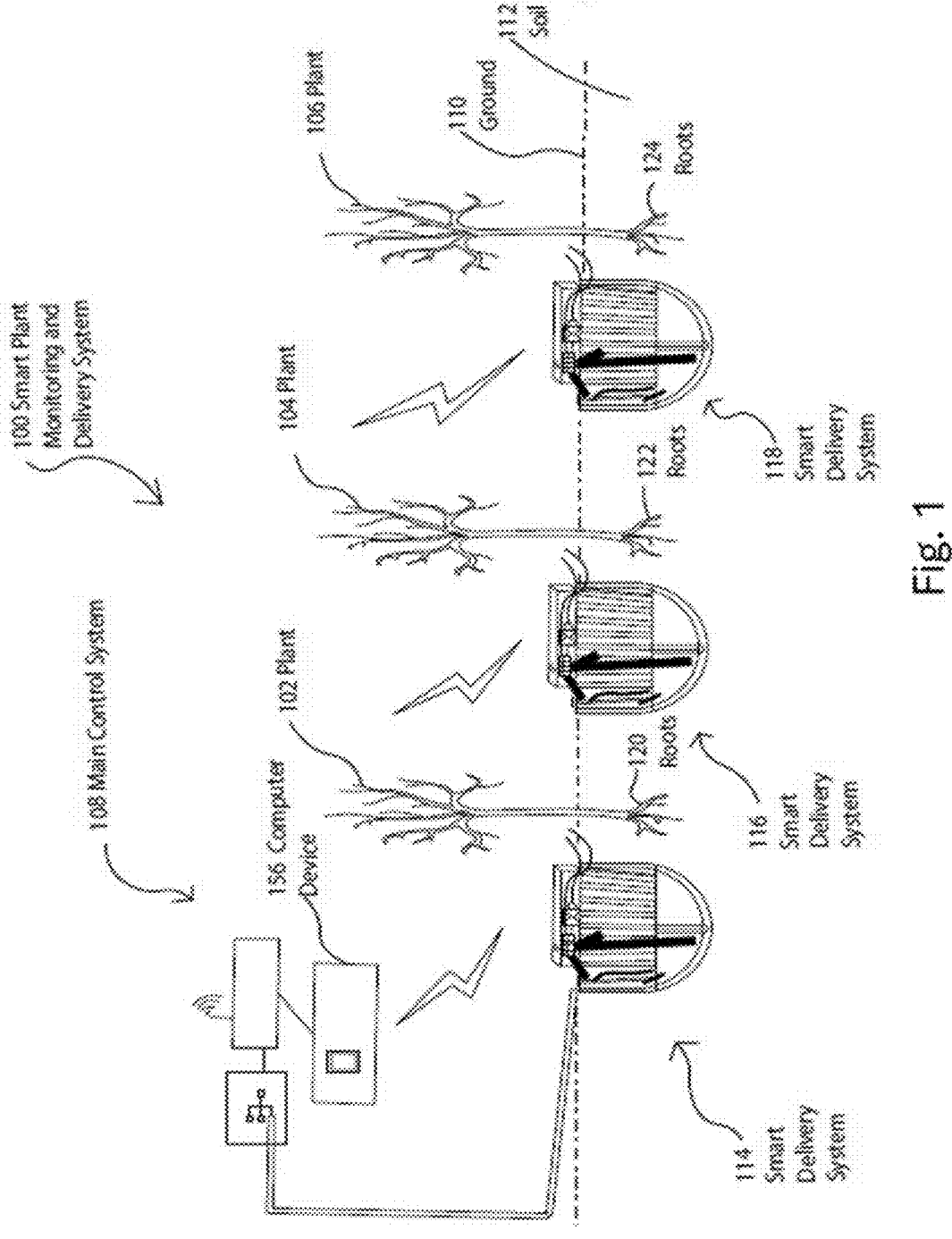
FIG. 1 is an isometric side view of smart plant monitoring and delivery system 100.

FIG. 1 is a side view of smart plant monitoring and delivery system 100 that helps monitor and maintain healthy plants 102-106. As illustrated in FIG. 1, plants 102-106 are planted in the ground 110. It should be understood that the term plants 102-106 in the current disclosure encompasses all living vegetation that grows in soil 112, and includes trees, bushes, flowers, house plants, potted plants, crops, grass and herbs. Typically a landscape or area has several different types of plants that are subjected to various environmental factors both indoors and outdoors that can affect each plant 102-106 differently. As illustrated in FIG. 1, the smart plant monitoring and delivery system 100 comprises a main control system 108 and smart delivery systems

114-118. Wireless communication between main control system 108 and smart delivery system 114-118 determine if an action (such as watering) should or will be taken regarding each individual plant, while also providing live information about each plant. Smart delivery systems 114-118 are planted in soil 112 next to the roots 120-124 of each plant 102-106, and. The smart delivery system 114-118 of each plant 102-106 monitors the roots 120-124 of each plant 102-106 individually. The main control system 108 and the smart delivery systems 114-118 communicate information with each other regarding the health and environmental elements of each plant individually. This is important because individual plants (102-106) can be subjected to different environments, or have a certain level of health and health requirements than a different plant of the same species. For example, an aloe plant could have been already overwatered at a nursery and the roots need to be aerated, yet another aloe could have been bought that was underwatered, and needs water. Additionally, different species of plants (102-106) have different needs. For example, a newly planted tree has a different water requirement (amount and frequency) than an aloe plant. In this way, the smart plant monitoring and delivery system 100 is a monitoring and delivery system that caters for each plant (102-104) individually, according to each individual plant's (102-104) needs. It should be noted that the number of plants 102-106 and the number of smart delivery systems 114-118 can vary from a single plant 102 with a single smart delivery system 114, to as many as many plants and smart delivery systems as the user chooses to use in the smart plant and monitoring system 100, and each plant can have more than one smart delivery system 114-118 planted by the plant roots 120-124. In other words, the number of plants used in the smart plant and monitoring system 100 can be as many as the user desires, and each plant 102-106 can have multiple smart delivery systems 114-118 disposed by the plant roots 120-124. For example, plant 102 shown in FIG. 1 can have multiple smart delivery systems disposed near the roots 120 of plant 102, as desired by the user. Additionally, the smart plant monitoring and delivery system 100 can also include an internet cloud database with integration API (application programming interface) with automated watering system. The phone application is also connected to the cloud database with individual specific plant data for water/air/light/ nutrient needs.

Figure 2:
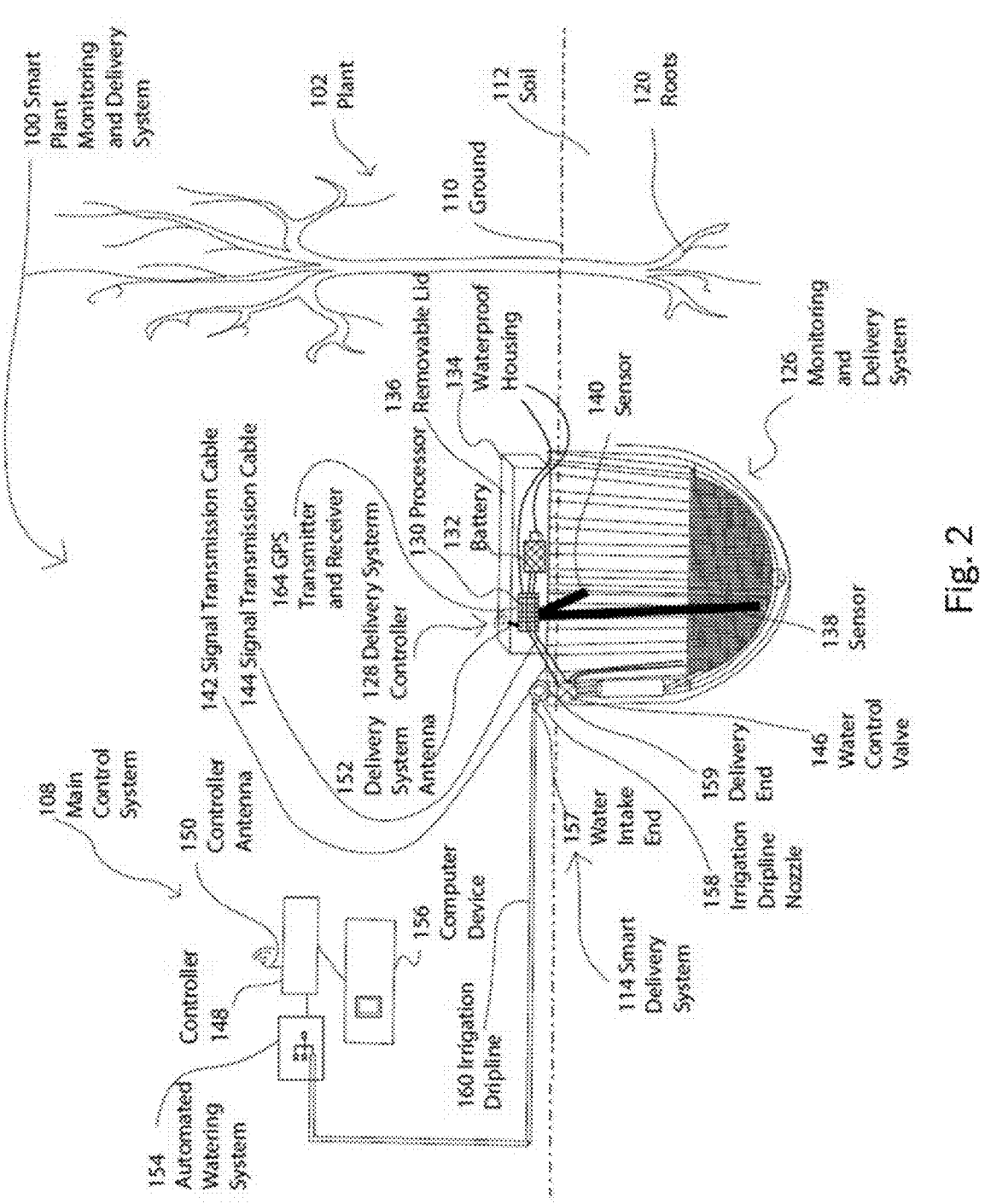
FIG. 2 is an isometric view of the smart plant monitoring and delivery system 100 of FIG. 1 showing a single plant.

FIG. 2 is a side view of smart plant monitoring and delivery system 100 of FIG. 1 and further illustrates how the smart plant monitoring and delivery system 100 interacts with each plant 102-106 (FIG. 1), using plant 102 and smart delivery system 114 (FIG. 1) as an example.

FIG. 2 shows smart delivery system 114 disposed next to plant 102, with plant 102 being planted in the soil 112 of the ground 110. Smart delivery system 114 comprises a root monitoring and delivery system 126 and a delivery system controller 128. Root monitoring and delivery system 126 is planted in soil 112 next to the roots of plant 102 and serves several functions which include watering, aerating, monitoring, and supplying nutrients to the roots 120. The delivery system controller 128 is connected to the root monitoring and delivery system 126 and comprises a processor 130 with a GPS transmitter and receiver 164, a battery 132 housed in a waterproof housing 134 with a removable lid 136. The GPS transmitter and receiver 164 can be used so that each smart delivery system 114-118 (FIG. 1) can be distinguished from each other and each plant can be found by location. The battery 132 can be rechargeable and the components within the waterproof housing 134 of the delivery system controller 128 can be accessed via the removable lid 136. The delivery system controller 128 is connected to the root monitoring and delivery system 126 by ways known in the art to attach things together, such as, but not limited to using snap on style, glue, hook and loop, screws, bolts, and other ways known in the art.

The root monitoring and delivery system 126 has various sensors 138-140 that are connected to and communicate with processor 130. Sensors 138-140 indicate live aspects of the plant's 102 health including the need for water, nutrients and light. It should be noted that numerous sensors may be employed and sensors 138-140 are merely shown as an example of two sensors, and more than two sensors can be used at various locations and heights within root monitoring and delivery system 126. As shown in FIG. 2, a sensor 138 may be disposed near the bottom close of root monitoring and delivery system 126 close to the roots 120, and another sensor 140 disposed closer to the top of root monitoring and delivery system 126 so that various depts can be monitored. For example, if sensors 138-140 are both moisture sensors, then sensor 138 can monitor the moisture at various depths from the moisture at the roots, to the saturation of the soil above the roots. Examples of sensors that can be used include but are not limited to light sensors, moisture sensors, sensors that detect various chemicals and nutrients in the soil (e.g. nitrogen, phosphorus, potassium), PH sensors, temperature sensors, sensors that determine soil conditions (such as but not limited to sandy, clay, or lumi) and other sensors known in the art. Sensors 138-140 communicate information about the soil 112 and roots 120 with processor 130, and processor 130 sends signals to root monitoring and delivery system 126 via signal transmission cables 142-144 which operates the water control valve 146 of the root monitoring and delivery system 126.

Delivery system controller 128 receives live information from sensors 138-140 and main control system 108 comprises a controller 148, an automated watering system (such as a zoned sprinkler system) 154, and a computer device 156. The controller 148 and the delivery system controller 128 wirelessly communicate with each other via the controller antenna 150 and the delivery system antenna 152. Controller 148 communicates with the automated watering system 154 and a computer device 156. Computer device 156 has a smart phone type of application that has various recommendations for various types of plants, such as, but not limited to recommended light, water, aeration, and nutrients for specific plants. Based upon the conditions monitored by sensors 138-140, the delivery system controller 128 can communicate with the controller 148 to send a signal to the automated watering system 154 to activate a zone of the or area to be turned on or off by the automated watering system 154. The automated watering system 154 is connected to various irrigation drip lines 160 that are connected to a water intake end 157 of an irrigation drip line nozzle 158 that supplies water to the root monitoring and delivery system 126. The controller 148 wirelessly communicates with the delivery system controller 128, and the processor 130 communicates with the water control valve that regulates water to the roots 120. Because each plant 102-106 (FIG. 1) has at least one smart delivery system 114-118 (FIG. 1) associated with it, the smart plant monitoring and delivery system 100 monitors and delivers what is needed for each plant 102-106 (FIG. 1) individually, which often varies for each plant based upon the environmental conditions for each plant, and the species of each plant (earlier discussed in FIG. 1). Additionally, it should be noted that the term "computer device" is any device having a computer that can communicate back and forth with controller 148. An example of a controller that can be used is a gateway, and other devices known in the art. In other words, controller 148 acts as a gateway to wirelessly communicate with computer device 156, automated watering system 154, and delivery system controller 128, while delivery system controller 128 acts as an IoT (internet of things) at the root of each plant that provides live information regarding each plant Examples of computer devices are devices such as laptops, desktops, cell phones, or other devices known in the art. Computer device 156 has a smart phone type of application that has various recommendations for various types of plants, such as, but not limited to light, water, aeration, and nutrients for specific plants. Each plant 102-106 (FIG. 1) has at least one smart delivery system 114-118 (FIG. 1) associated with each plant. Each smart delivery system 114-118 (FIG. 1) communicates with controller 148, and controller 148 wirelessly communicates with automated watering system 154, computer device 156, and delivery system controller 128. It should be noted that wireless communications in the present disclosure can be accomplished by several technologies. Non-limiting examples of wireless communication are WiFi IEEE 802.11 all versions, ZIGBEE all versions, Bluetooth all versions, LoraWAN all versions, Earth-Mode all versions, Free Space Optics all versions, Light Emitting Networks, Cellular 4/5G, or any other type of wireless communication known in the art.

In use, a user having a computer device 156 with a computer application installed that is pre-programmed with environmental data concerning the health of specific plant species, inputs data into the computer application on the computer device 156 regarding each plant 102-106 (FIG. 1) associated with each smart delivery system 114-118 (FIG. 1). The processor 130 for each smart delivery system 114-118 (FIG. 1) continuously monitors the soil 112 and roots 120-124 (FIG. 1) of each individual plant 102-106 (FIG. 1) as provided by the sensors of each individual plant 102-106 (FIG. 1). The processor 130 for each smart delivery system 114-118 (FIG. 1) continuously wirelessly communicates with the controller 148 of the main control system 108. The controller 148 continuously communicates with both the automated watering system 154, and computer device 156. If a user wants to see real live data regarding each individual plant, the user can check the computer application installed on their computer device 156 and see live data (such as moisture, air, light and nutrient levels) for each individual plant 102-106 (FIG. 1). If the smart delivery system 114-118 (FIG. 1) indicates an action needs to be taken (such as watering), the controller 148 will send a command to the automated watering system 154 to turn on a specific area or zone where the plant is located. Additionally, the controller 148 will send a signal to the computer device to alert the user an action is being taken, and the controller 148 will communicate with the delivery system controller 128 so that processor 130 will send signals via the signal transmission cables 142-144 to activate and regulate the water control valve 146.

It should be noted that the smart plant monitoring and delivery system 100 can be utilized in the absence of automated watering system 154 (e.g. in situations where a sprinkler system is not employed). In the absence of an automated watering system 154, there is still live communication between delivery system controller 128, controller 148, and computer device 156. If an automated watering system 154 is not employed, a user can simply attach a hose to water intake end 157 of irrigation drip nozzle 158, and computer device 156 can indicate live information regarding each plant and alerts when to turn on and off water being supplied to smart delivery system 114. To generally describe, both a hose and irrigation drip line 160 attached to automated watering system 154, both can be referred to as a water supply conduit since they both supply water via a tube.

If a user decides they want to supply something to the plant 102 (for example water) that isn't automatically automated, the user can indicate in the installed computer application a desired action (for example a desired moisture level). This can be done for each plant 102-106 (FIG. 1) individually. The controller 148 receives the communication from the computer device 156, activates the automated watering system 154 to turn on the water, and communicates with the individual plant 102-106 (FIG. 1) delivery system controller 128. The processor 130 of the delivery system controller 128 then sends signals via the signal transmission cables 142-144 to the water control valve 146 to regulate the water coming from the delivery end 159 of the irrigation drip line nozzle 158.

Figure 3:
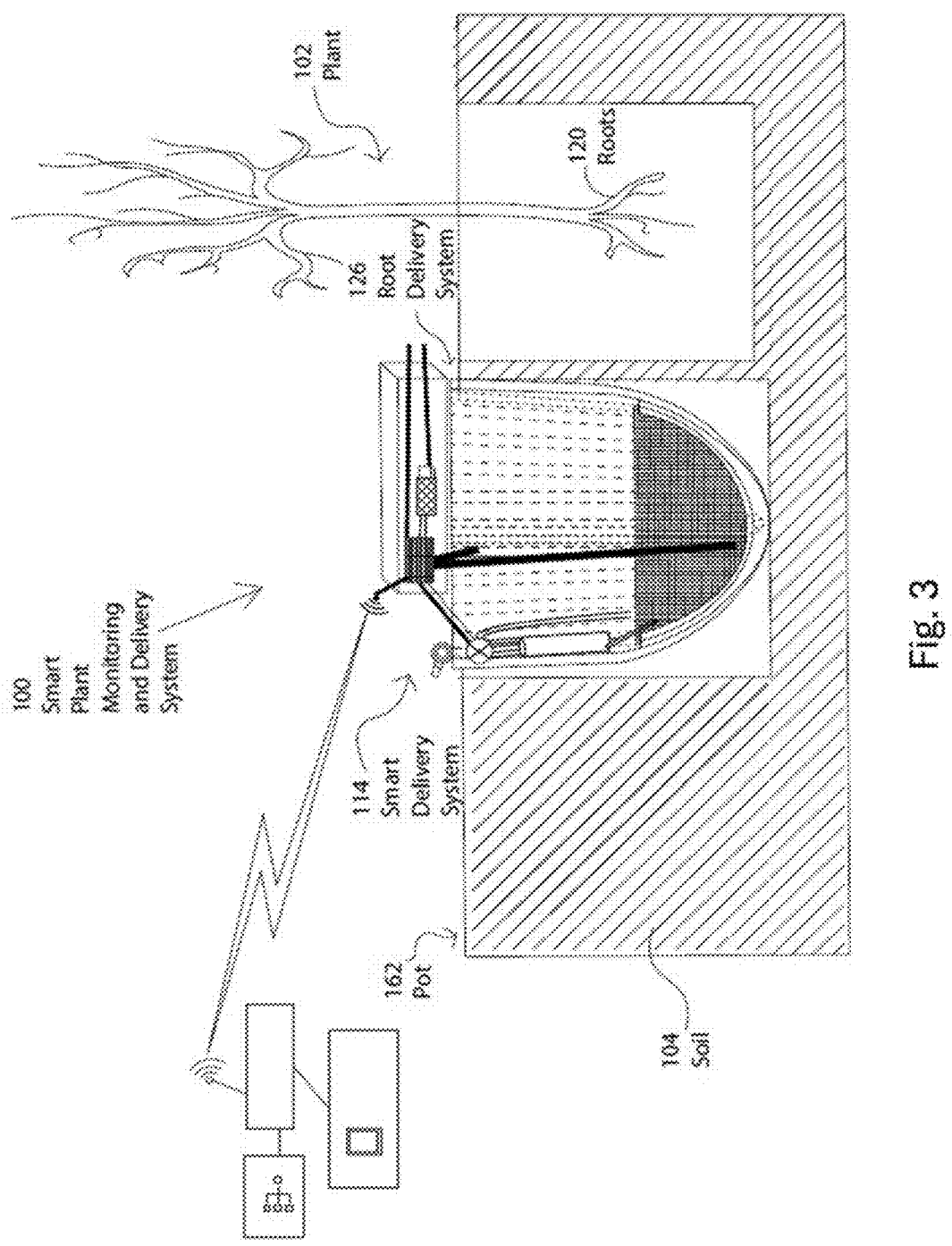
FIG. 3 is an isometric view of the smart plant monitoring and delivery system 100 of FIG. 1 showing a single plant in a pot.

FIG. 3 is a side view of the smart plant monitoring and delivery system 100 shown in FIGS. 1-2 with root monitoring and delivery system 126 disposed next to roots 120 of plant 102 in soil 104. The only difference between FIGS. 2 and 3 is plant 102 and smart delivery system are disposed in a pot 162, as opposed to the ground 110 (FIG. 1). In other words, FIG. 3 is illustrating that the smart plant monitoring and delivery system 100 works the same way weather plants 102-106 (FIG. 1) are planted in the ground 110 (FIG. 1) or in pots 162.

Figure 4:
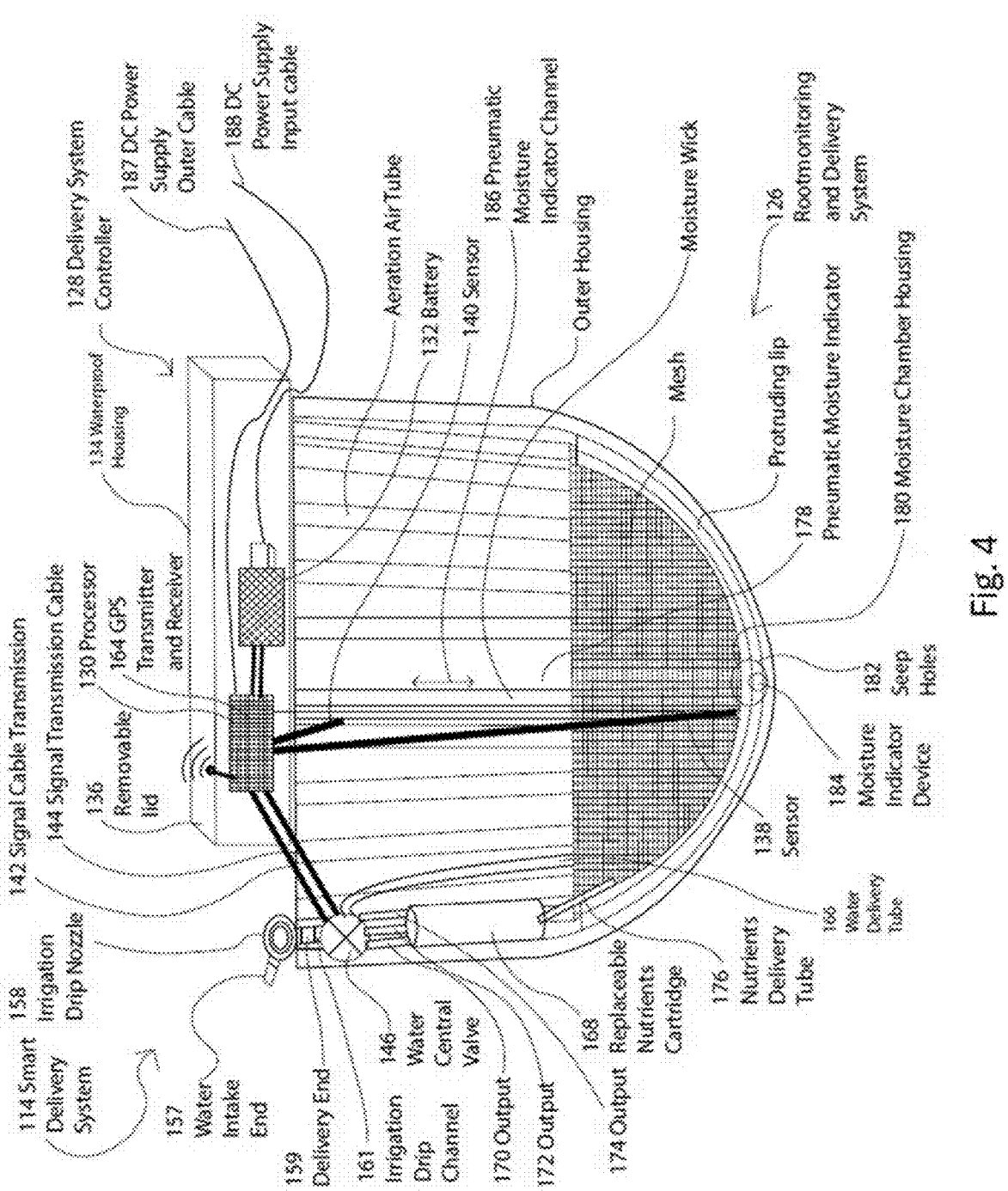
FIG. 4 is an isometric view of the smart delivery system of FIG. 2.

FIG. 4 is a side view of smart the delivery system 114 shown in FIGS. 1-3. As previously discussed, smart the delivery system 114 comprises root monitoring and delivery system 126 and delivery system controller 128. The delivery system controller 128 comprises processor 130 with a GPS transmitter and receiver 164, and battery 132 in a waterproof housing 134 with a removable lid. Waterproof housing 134 may be made of plastic or any other type of waterproof material. Non-limiting examples of waterproof materials include laminates, thermoplastics, natural and synthetic rubbers, latex, vinyl, plexiglass, or any other type of waterproof materials known in the art. Waterproof housing 134 has a removable lid 136 that is connected to the rest of the waterproof housing 134 in a manner to maintain the waterproofness of waterproof housing 134. Removable lid 136 is shown on the top of waterproof housing 134, however, removable lid 136 may be located on any side of waterproof housing 134. Removable lid 136 provides a convenient way to access the inside of the waterproof housing 134. A user may want to access the inside of the waterproof housing 134 for various reasons such as, but not limited to cleaning, inspecting, replacing components, adjusting components, adding and removing components. Non-limiting examples include replacing battery 132, adding or removing sensors, adding or removing components that assist in communicating information to the outside of the waterproof housing 134 (such as a digital reader for the battery life, as a non-limiting example), or adding components that communicate with other parts of the smart plant monitoring and delivery system 100 (such as another wireless controller, as a non-limiting example). Removable lid 136 can be attached to waterproof housing 134 in various ways, such as but not limited to, friction fit with or without an inner flexible gasket, snap down latches, sliding dovetail, or other ways known in the art that seal a lid on a container. Removable lid 136 may also be attached to a sidewall of the waterproof housing 134 with various hinges known in the art, such as, but not limited to a living hinge, a leaf hinge, or other hinges known in the art. Waterproof housing 134 can be manufactured by various means known in the art, such as, but not limited to injection moulding, plastic extrusion, plastic rotational moulding, thermoforming, and vacuum casting, as non-limiting examples.

FIG. 4 also illustrates a DC power supply cable 187 that can power various devices that can be added to the smart plant monitoring and delivery system 100. Additionally, battery 132 may be rechargeable and therefore have a DC power supply input cable 188 that attaches to a device that can provide power for battery 132.

As discussed earlier, root monitoring and delivery system 126 monitors the roots of plants 102-106 (FIG. 1) via sensors 138-140 (FIG. 2), while also aerating, watering and providing nutrients to the roots 120-124 (FIG. 1) of individual plants 102-106 (FIG. 1). As illustrated in FIG. 4, root monitoring and delivery system 126 has irrigation drip nozzle 158 that has a water intake end 157 that is hooked up to a hose or irrigation drip line 160, and a delivery end 159 disposed in irrigation drip channel 161 that is connected to water control valve 146. Water control valve 146 can be operated either manually or by signal transmission cables 142-144. Water control valve 146 is connected to water delivery tube 166 and replaceable nutrients cartridge 168. Replaceable nutrients cartridge 168 can be a cartridge that is individualized for each type of plant that are made of a solid material and when dissolved, slowly releases nutrients. Replaceable nutrients cartridge 168 is an insert that is placed in the root monitoring and delivery system 126 and can be tailored for the nutrient needs of each plant. As shown in FIG. 4, the replaceable nutrients cartridge 168 cartridge can have various channels inside with each channel containing a different nutrient, such as nitrogen, phosphorus, and potassium. Water control valve 146 can be any type of valve, such as a 1:1, 1:2, 1:3, 1:4 that has a default off position when controlled electronically by signal transmission cables 142-144. When signal transmission cables 142-144 signal water control valve 146 to turn on, water will flow through the valve(s) that open. FIG. 4 shows a 1:4 valve as an example and showing four different water outputs (i.e. outputs 170-174 and water delivery tube 166), and a variation of one to all four valves can be open (water flowing), depending on the signals sent from the signal transmission cables 142-144 to water control valve 146. The signals are based upon the plant's needs, as according to processor 130. In other words, the processor 130 monitors and gathers information about the roots 120 (FIG. 2) of the plant 102 (FIG. 2) by information provided from sensors 138-140 The processor 130 processes the information gathered from sensors 138-140, and determines if the plant needs plain water, and/or nutrients, which nutrients, and which nutrients at what concentration. The processor 130 compiles the information for what the plant needs (regarding water and nutrients within the replaceable nutrients cartridge 168) and sends signals to the water control valve 146 indicating which valves of the four output valves to open (causing water flow). Water control valve 146 receives the signals generated by processor 130 and opens the valves that were indicated to have water flow. In other words, water control valve 146 has four outputs which are: output 170, output 172, output 174, and water delivery tube 166. Water delivery tube 166 delivers pure water to roots 120 (FIG. 2). Each output 170-174 is associated with a different valve on water control valve 146, and each output 170-174 continues as a separate channel through replaceable nutrients cartridge 168, with each channel having a different and separate nutrient. The water flowing out of each of outputs 170-174 and through their own separate channels through the replaceable nutrients cartridge 168, passes over a separate nutrient so the water flowing through separate channels becomes concentrated with the nutrient in the respective channel. At the very end of the replaceable nutrients cartridge 168 there is a tube that unites the channels and delivers the nutrients out of the nutrients delivery tube 176 and onto roots 120 (FIG. 2). For example, if output 170 is a channel within replaceable nutrients cartridge 168 that holds a nitrogen cartridge, output 172 is a channel within replaceable nutrients cartridge 168 that holds a phosphorus cartridge, and output 174 is a channel within replaceable nutrients cartridge 168 that holds a potassium cartridge, then if the valve associated with output 170 is opened, the water will flow from output 170, across nitrogen within the replaceable nutrients cartridge 168 and become concentrated with nitrogen and the nitrogen water mixture will be delivered to roots 120 (FIG. 2). If in the same example as above, the valve associated with output 174 is also open, then the water traveling through that channel will pass over potassium, becoming a water and potassium mixture, and at the end of the replaceable nutrients cartridge 168, the nitrogen and potassium mixtures will mix and deliver a mixture of nitrogen potassium and water mixture to roots 120 (FIG. 2) via nutrients delivery tube 176. In another example, if the processor 130 determines that no nutrients are needed at the roots 120 (FIG. 2), then the processor 130 would send a signal to the water control valve 146 (via signal transmission cables 142-144) indicating the water control valve 146 to only open the valve associated with water delivery tube 166, and so straight water would be sent to roots 120 (FIG. 2). If the processor 130 determines that the roots 120 (FIG. 2) need a high concentration of nitrogen and potassium, but not phosphorus, then the water control valve 146 would receive signals to only open the valves for water outputs that lead to the channel having each nutrient, but not open the valve for water delivery tube 166, since water delivery tube 166 delivers pure water. Aeration air tubes 228-242 aerate roots 120.

Also shown in FIG. 4 is a pneumatic moisture indicator 178, having a moisture chamber housing 180 with seep holes 182, and a moisture indicator device 184. The pneumatic moisture indicator 178 is a way to visually determine the water level at the roots of the plant by looking down into a pneumatic moisture indicator channel 186 that extends along the height of the root monitoring and delivery system 126 (further discussed in FIG. 5).

Figure 5:
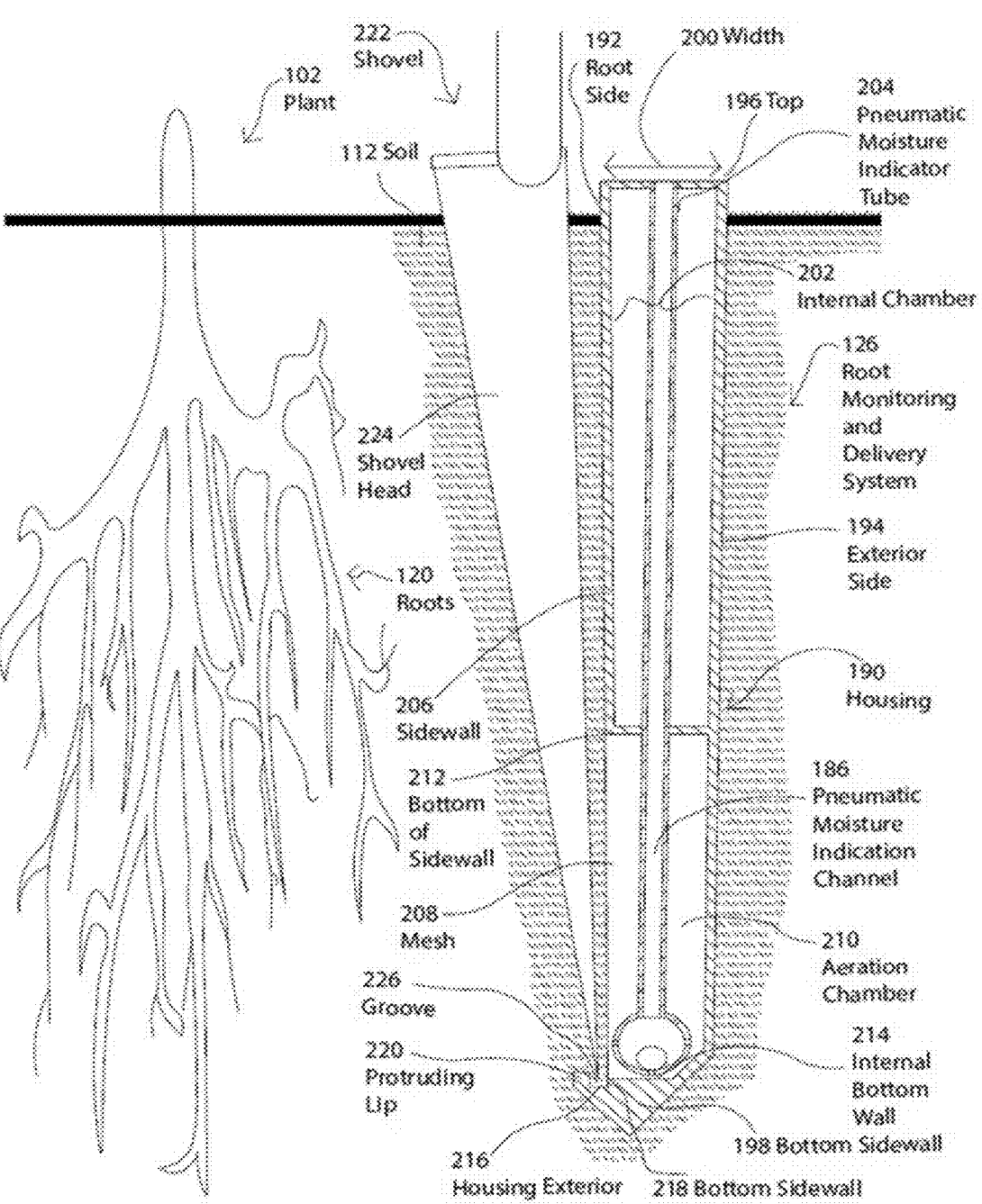
FIG. 5 is an isometric side view of root monitoring and delivery system of FIG. 2 being installed with a shovel.

FIG. 5 is a side cross-sectional view of root monitoring and delivery system 126. FIG. 5 illustrates root monitoring and delivery system 126 being installed next to roots 120 of plant 102 with shovel 222 having shovel head 224. Root monitoring and delivery system 126 has a housing 190 that is shaped to fit on the back of a shovel head 224 of a shovel 222. The housing 190 is made of a material that can hold its shape. Non-limiting examples include plastics, metals, rubbers, and other materials known in the art. Housing 190 has a root side 192 closest to the roots 120, an exterior side 194 the side opposite the root side 192, a top 196, a bottom 198. The top 196 has a width 200 that joins the root side 192 and the exterior side 194 of housing 190 which creates an internal chamber 202 between the root side 192 and the exterior side 194 of housing 190. The internal chamber 202 is where various tubes and channels are located in the root monitoring and delivery system 126, such as pneumatic moisture indicator tube 204 having pneumatic moisture indicator channel 186 shown in FIG. 5. Root side 192 comprises a solid piece of sidewall 206 that is connected to mesh 208. Mesh 208 can be made integral with sidewall 206, or can be connected to sidewall 206 via ways known in the art, such as, but not limited to gluing, clamping, screwing, bolting. Mesh 208 can be the same material as sidewall 206 or different material than sidewall 206. Housing 190 (including mesh 208) can be manufactured as a single piece using known methods in the art, such as, but not limited to injection moulding, 3D printing, plastic extrusion, plastic rotational moulding, thermoforming, and vacuum casting, as non-limiting examples. Mesh 208 provides air and water to the roots 120 while also helping prevent soil 112 from entering aeration chamber 210. Mesh extends from bottom of sidewall 212 to an internal bottom wall 214 of housing 190. Bottom 198 of housing 190 has a bottom sidewall 218 that extends vertically from internal bottom wall 214, and a housing extension 216 that extends laterally from the bottom sidewall 218. The bottom 198 has a protruding lip 220 that extends vertically from housing extension 216 which serves as a lip that shovel head 224 uses to maintain the root monitoring and delivery system 126 securely on shovel head 224. In other words, housing extension 216 extending laterally from bottom sidewall 218 and protruding lip 220, creates a groove 226 where the bottom of shovel head 224 is placed in housing 190, and protruding lip 220 prevents the shovel head 224 from sliding off of the bottom 198 of housing 190 so the root monitoring and delivery system 126 can be secured onto shovel head 224 while disposing root monitoring and delivery system 126 by roots 120.

To install the smart delivery system 114-118 (FIGS. 1-3) in soil 112, shovel head 224 is inserted into soil 112 adjacent to the roots 120-124 (FIG. 1) at the desired depth for root monitoring and delivery system 126. It should be noted that the desired depth of root monitoring and delivery system 126 may vary depending upon the type of plant. For example, trees may have deeper roots than other plants, such as bushes. Shovel head 224 is completely inserted into the soil at the desired depth that root monitoring and delivery system 126 is to be disposed. The shovel 222 is rocked back and forth in the soil to create a crescent shaped cavity. Once the desired crescent opening is achieved, the user keeps the shovel head 224 in the soil 112. The root monitoring and delivery system 126 is placed on the back surface of shovel head 224 and the root monitoring and delivery system 126 is pushed into the soil 112 by hand as far down as possible using normal (and not excessive) force. Once the user pushes the root monitoring and delivery system 126 as far down as possible, the shovel head 224 is partially lifted up in the soil 112, the end of the shovel head 224 then catches the protruding lip 220 so that the end of the shovel head is in groove 226. Once the shovel head end is in groove 226, the shovel head is then pushed back down into the crescent opening. The root monitoring and delivery system 126 is pushed into the soil until only the top 196 of the root monitoring and delivery system 126 is visible above ground. The shovel head is removed from the soil 112 and the root monitoring and delivery system 126 is successfully disposed in soil 112 near the roots 120 to be aerated and watered. If the delivery system controller 128 is not made integral with or attached to the root monitoring and delivery system 126, the delivery system controller 128 can be snapped on top of the root monitoring and delivery system 126 (or attached by any other means known in the art).

Figure 6:
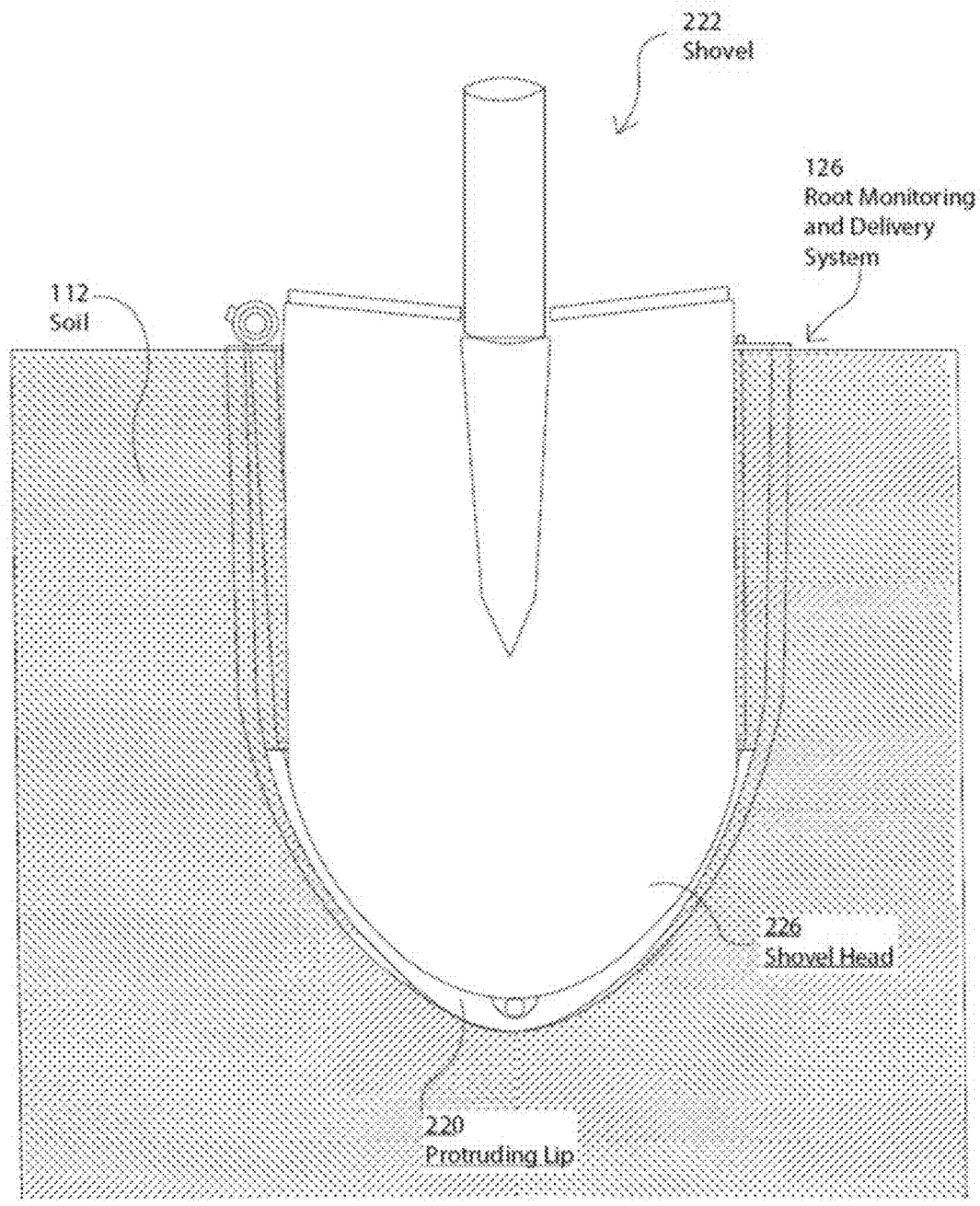
FIG. 6 is an isometric front view of FIG. 5.

FIG. 6 is a front view of root monitoring and delivery system 126 being disposed in soil 112 by shovel 222, and further illustrating protruding lip 220, as well as the root monitoring and delivery system 126 being shaped to fit on the back of shovel head 226.

Figure 7:
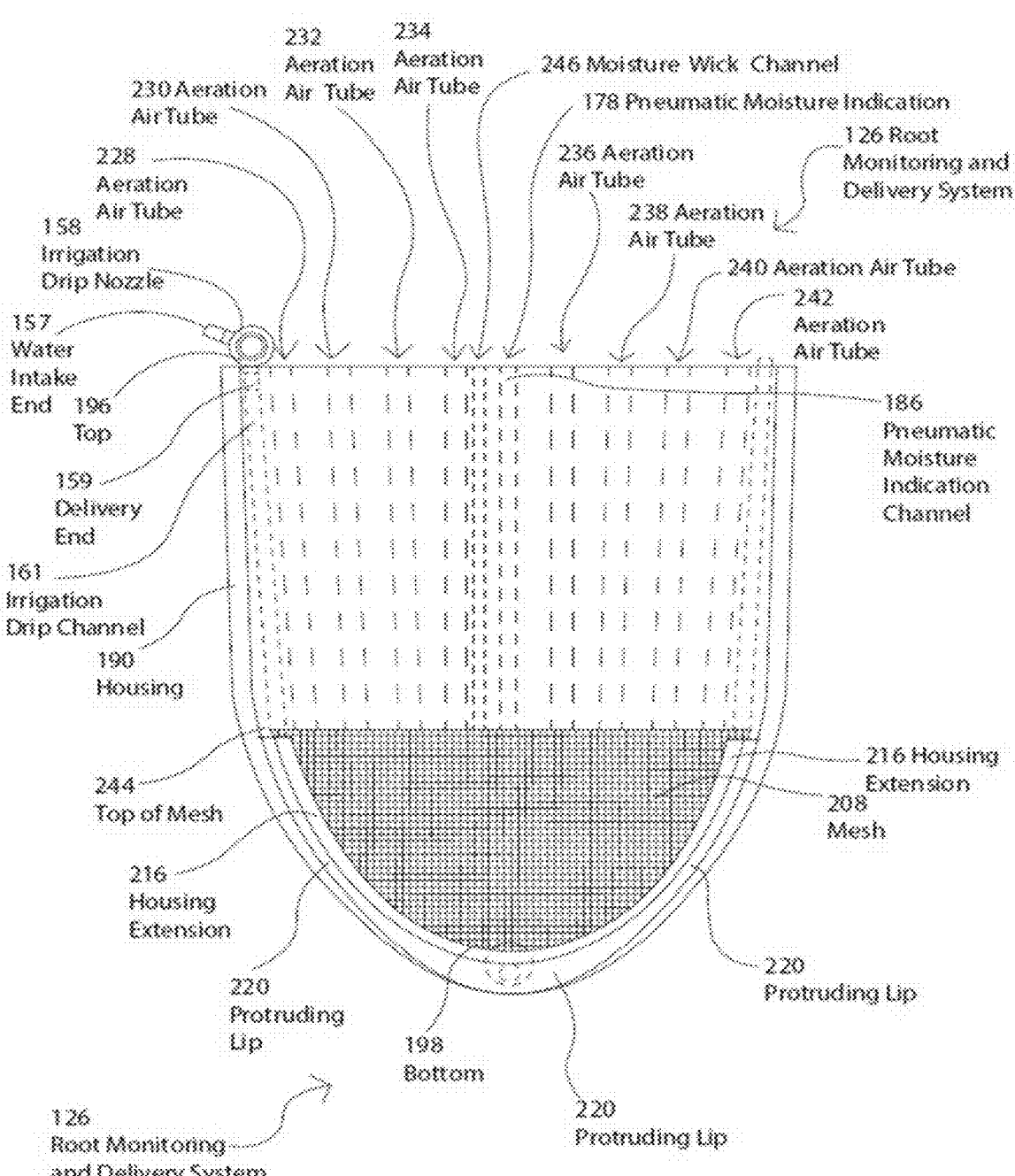
FIG. 7 is an isometric view of root monitoring and delivery system of FIG. 4.

FIG. 7 is a front cross-sectional view of root monitoring and delivery system 126 shown in FIGS. 1-6 and further illustrating the components within housing 190. As previously discussed, irrigation drip nozzle 158 has a water intake end 157 that attaches to a water source, and a delivery end 159 that is disposed through the top 196 of housing 190 and into irrigation drip channel 161. Root monitoring and delivery system 126 has multiple aeration air tubes 228-242 that are laterally spaced from each other and span the inside of the housing 190. Each aeration air tube 228-242 extends from the top 196 of housing 190, through bottom of sidewall 212 (FIG. 5), and have an open end at the top of mesh 244 that leads into the aeration chamber 210 (FIG. 5). In this manner, aeration air tubes 228-242 aerate roots 120 (FIGS. 1-3 and 5) by allowing air to flow between the aeration chamber 210 (FIG. 5) and above the soil 112 (FIGS. 1-3 and 5). In other words, aeration air tubes 228-242 create an area that is open and creates of airflow between the mesh 208 where the aeration chamber 210 and roots 120-124 (FIG. 1) are located with the air above and outside of the housing.

Root monitoring and delivery system 126 can also utilize a moisture wick channel 246 in the case that a replaceable moisture wick 248 (FIGS. 10-11) is desired. As shown in FIG. 7, the moisture wick channel 246 can extend from the top 196 of housing to the bottom 198 of housing and 190 to assist in drying out, or regulating the moisture in aeration chamber 210. Non-limiting examples of moisture wicks include bamboo, cotton, reeds, and any other moisture wicks known in the art.

FIG. 7 also further illustrates pneumatic moisture indicator 178 having pneumatic moisture indicator channel 186 (previously discussed in FIGS. 4-5), protruding lip 220 and housing extension 216 (previously discussed in FIGS. 5-6).

Figure 8:
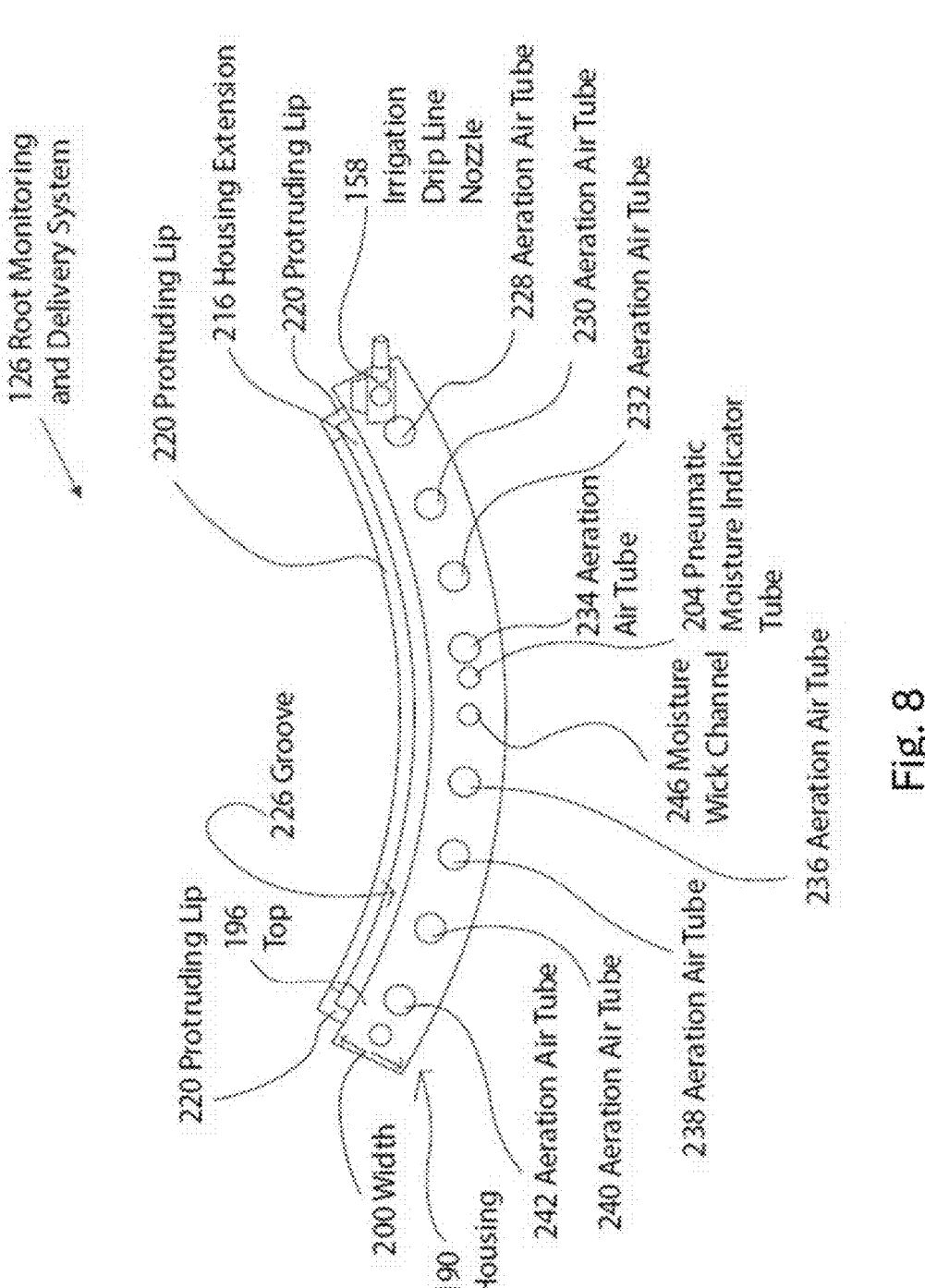
FIG. 8 is a top view of FIG. 7.

FIG. 8 is a top view of the root monitoring and delivery system 126 previously discussed in FIGS. 1-7. FIG. 8 further illustrates root monitoring and delivery system 126 with housing 190 having a width 200, aeration air tubes 228-242, moisture wick channel 246, pneumatic moisture indicator tube 204, and irrigation drip line nozzle 158 shown on top 196 of housing 190. Although FIG. 8 shows aeration air tubes 228-242, any number of aeration air tubes 228-242 could be used and could range from a single aeration air tube 228, to as many aeration air tubes 228-242 are desired. Additionally, FIG. 8 shows protruding lip 220, and housing extension 216 that creates groove 226 (previously discussed in FIG. 5). It should be noted that protruding lip extends around the perimeter of housing extension 216. Root monitoring and delivery system 126 can also be manually controlled if the cloud internet database and internet is not available.

Figure 9:
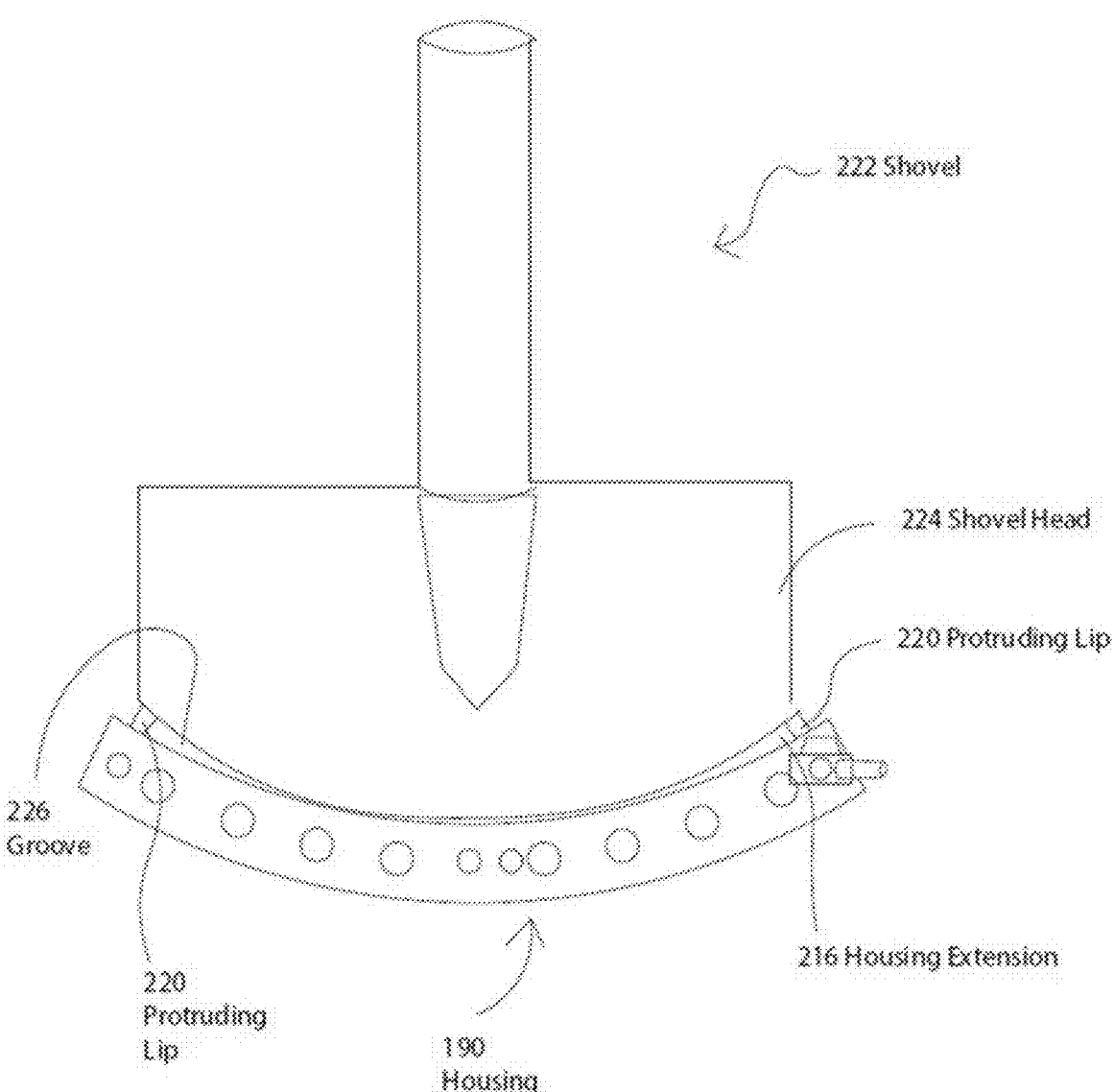
FIG. 9 is a top view of FIG. 5.

FIG. 9 is similar to FIG. 8 but also illustrates shovel 222 having shovel head 224 disposed in groove 226 which is formed by housing extension 216 and by protruding lip 220 (previously discussed in FIG. 5).

Figures 10, 11:
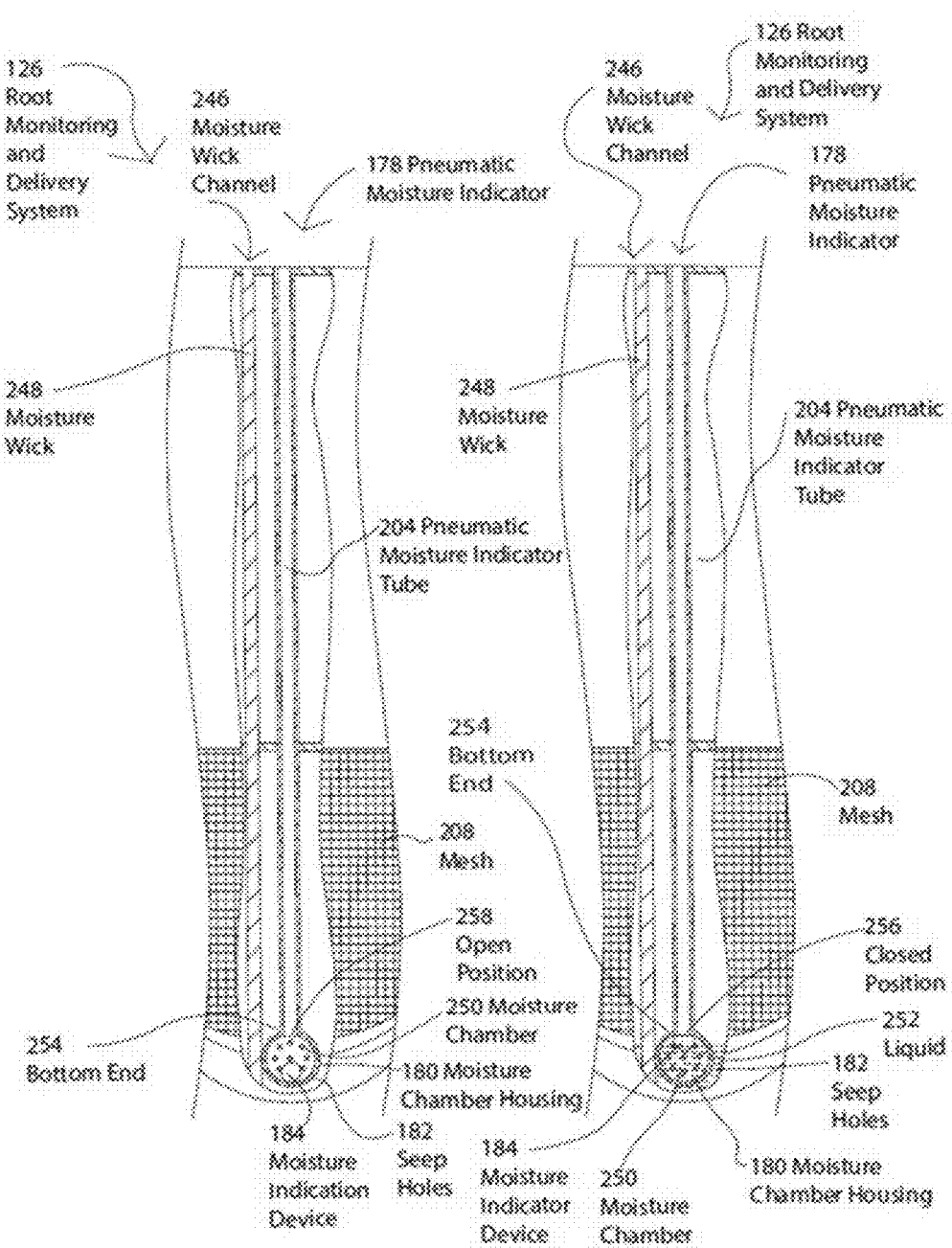
FIG. 10 is a cross-sectional view of FIG. 7.
FIG. 11 is a cross-sectional view of FIG. 7.

FIGS. 10-11 are both side cross-sectional views of root monitoring and delivery system 126 previously discussed in FIGS. 1-9 and further illustrates moisture wick 248. FIGS. 10-11 both show moisture wick 248 disposed in moisture wick channel 246, and may be replaced as needed (previously discussed in FIG. 7).

FIGS. 10-11 also further illustrate how the pneumatic moisture indicator 178 is used as a visual moisture level indicator. As previously discussed in FIGS. 4-5 and 7, pneumatic moisture indicator 178 comprises a pneumatic moisture indicator tube 204 that extends along the length of the root monitoring and delivery system 126. The bottom of the pneumatic moisture indicator tube 204 has moisture chamber housing 180. Inside of the moisture chamber housing 180 is a moisture chamber 250 where liquid such as water may collect (FIG. 11). Moisture chamber housing 180 has seep holes that allows liquid 252 to enter the moisture chamber 250. The moisture indicator device 184 (previously discussed in FIG. 4) is an object that floats. When liquid 252 (such as water or a water nutrient solution) is near the roots 120-124 (FIG. 1), the liquid 252 causes moisture indicator device 184 float upwards in the moisture chamber 250 towards the bottom end 254 of pneumatic moisture indicator tube 204. If enough liquid 252 is in moisture chamber 250, then the moisture indicator device 184 will float to the bottom of the pneumatic moisture indicator tube 204 and close the bottom end of the pneumatic moisture indicator tube 204. If the moisture chamber 250 is empty (FIG. 10), then the moisture indicator device 184 does not block the bottom end 254 of the pneumatic moisture indicator tube 204. The moisture indicator device 184 can be a bright color, glow in the dark, or have other characteristics for easily being seen as known in the art. A visual inspection down the pneumatic moisture indicator tube 204 can indicate if the moisture chamber is full by not seeing the moisture indicator device 184 because the moisture indicator device 184 is blocking the bottom end 254 of the pneumatic moisture indicator tube 204 and creating a closed position 256. If the moisture indicator device 184 is seen by looking down the pneumatic moisture indicator tube 204, then the bottom end 254 of pneumatic moisture indicator tube 204 is not blocked, indicating an open position 258 which means that the moisture indicator device 184 is not floating (FIG. 10), and that the roots 120-124 (FIG. 1) may need water.

Additionally, it should be noted that root monitoring and delivery system 126 may be used as a device on its own to aerate, water, and supply nutrients to roots 120-124 (FIG. 1) without the use of electronics. Additionally, the pneumatic moisture indicator 178 can provide a visual moisture indicator, and moisture wick 248 can also provide a visual indicator of excess moisture if the moisture wick 248 is saturated, as well as helping to maintain and regulate the moisture level near roots 120-124 (FIG. 1). For example, referring to FIGS. 7-11, water intake end 157 may be connected to a hose, and the irrigation drip nozzle 158 may be operated manually. A slow release replaceable nutrients cartridge 168 can be inserted into irrigation drip channel 161 if a nutrients and water solution is desired. A user manually turns on the water source, and manually turns on the irrigation drip line nozzle 158 so that water flows from the delivery end 159 of the irrigation drip line nozzle 158, down the irrigation drip channel 161 through the slow release replaceable nutrients cartridge 168 (if one is in the irrigation drip channel 161), and into mesh 208 where the water or water nutrients solution is delivered to roots 120-124 (FIG. 1). If a slow release replaceable nutrients cartridge 168 is not used, then pure water vs a water/nutrients solution is delivered to roots 120-124 (FIG. 1). Additionally, some plants 102-106 (FIG. 1), may use the root monitoring and delivery system 126 with the delivery system controller 128 that communicates with controller 148, while other plants 102-106 (FIG. 1) may only use the root monitoring and delivery system 126 without the use of electronics. For example, referring to FIG. 1, plants 102 and 104 may use the root monitoring and delivery system 126 with electronics (previously discussed in FIGS. 1-4), and plant 106 may use the root monitoring and delivery system 126 without electronics (such as sensors 138-140, signal transmission cables 142-144 that controls water control valve 146).

Figure 12:
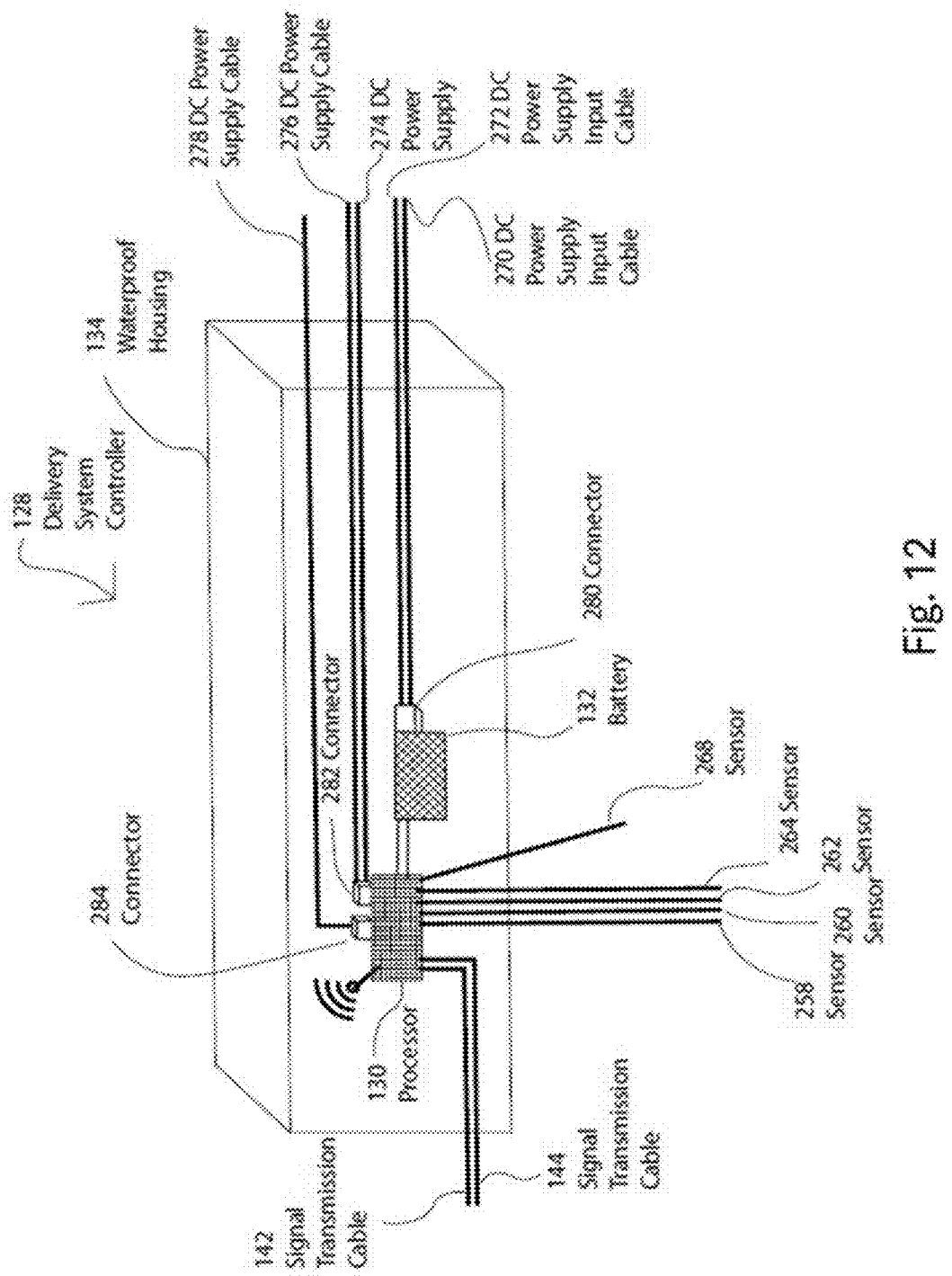
FIG. 12 is an isometric view of delivery system controller of FIG. 2.

FIG. 12 is the delivery system controller 128 previously discussed in FIGS. 2-4 and further illustrates components of the delivery system controller 128. Processor 130 has signal transmission cables 142-144 that transmit signals to each of smart delivery system 114-118 (FIG. 1). Sensors 258-266 are connected to processor 130, and battery 132 powers processor 130. Battery 132 can be rechargeable and have DC power supply input cables 270-272 that can be connected to external devices that provide power to battery 132. A connector 280 can be used to connect the DC power supply input cables 270-272 to battery 132. DC power supply cables 274-278 can provide power to external devices and are connected to processor 130 by connectors 282-284. For example, DC power supply cables 274-278 can be used or LED lighting and turn on and off LED lights. DC power supply cables 274-278 are in a default power off position until processor 130 sends a signal to allow DC power to flow from each of DC power supply cables 274-278.

Figure 13:
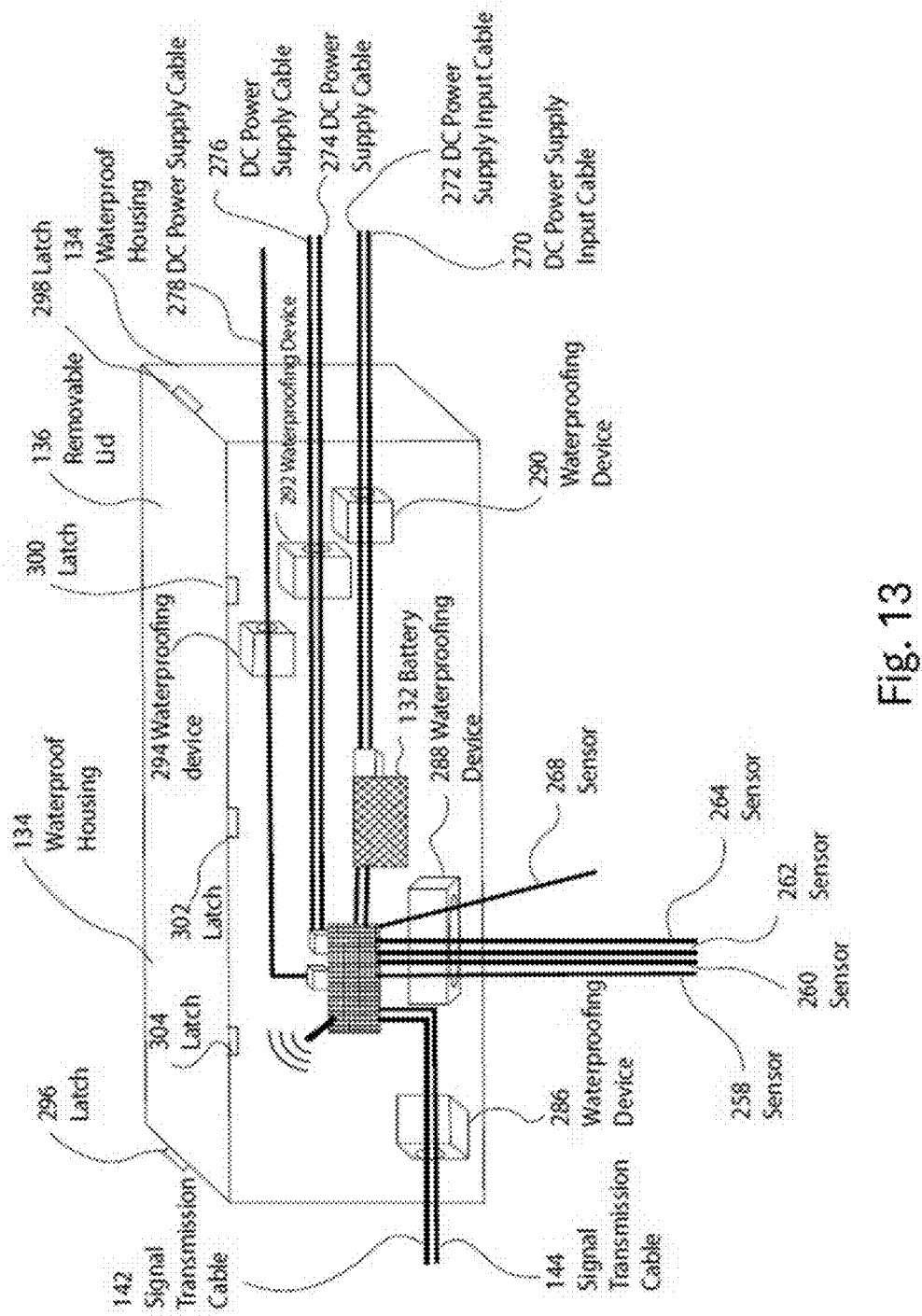
FIG. 13 is an isometric view of delivery system controller of FIG. 2.

FIG. 13 similar to FIG. 12 and further illustrates waterproofing devices 286-294 that create a waterproof seal between devices and the waterproof housing 134, and latches 296-298 that can be used on removable lid 136 of waterproof housing 134. Waterproofing devices 286-294 can be devices known in the art that can provide waterproof sealing for cables and sensors going through waterproof housing 134. Non-limiting examples that provide waterproof sealing include friction fit rubber stoppers, weatherproof cable grommets, rubber gaskets, waterproof compression sleeves, and other waterproof sealing mechanisms known in the art. As shown in FIG. 13, waterproofing device 286 is used for signal transmission cables 142-144, waterproofing device 288 is used for sensors 258-266, waterproofing device 290 is used for DC power supply input cables 270-272, waterproofing device 292 is used for DC power supply cables 274-276, and waterproofing device 294 is used for DC power supply cable 278. FIG. 13 also illustrates using latches 296-302 to secure and remove removable lid 136 on waterproof housing 134.

Figure 14:
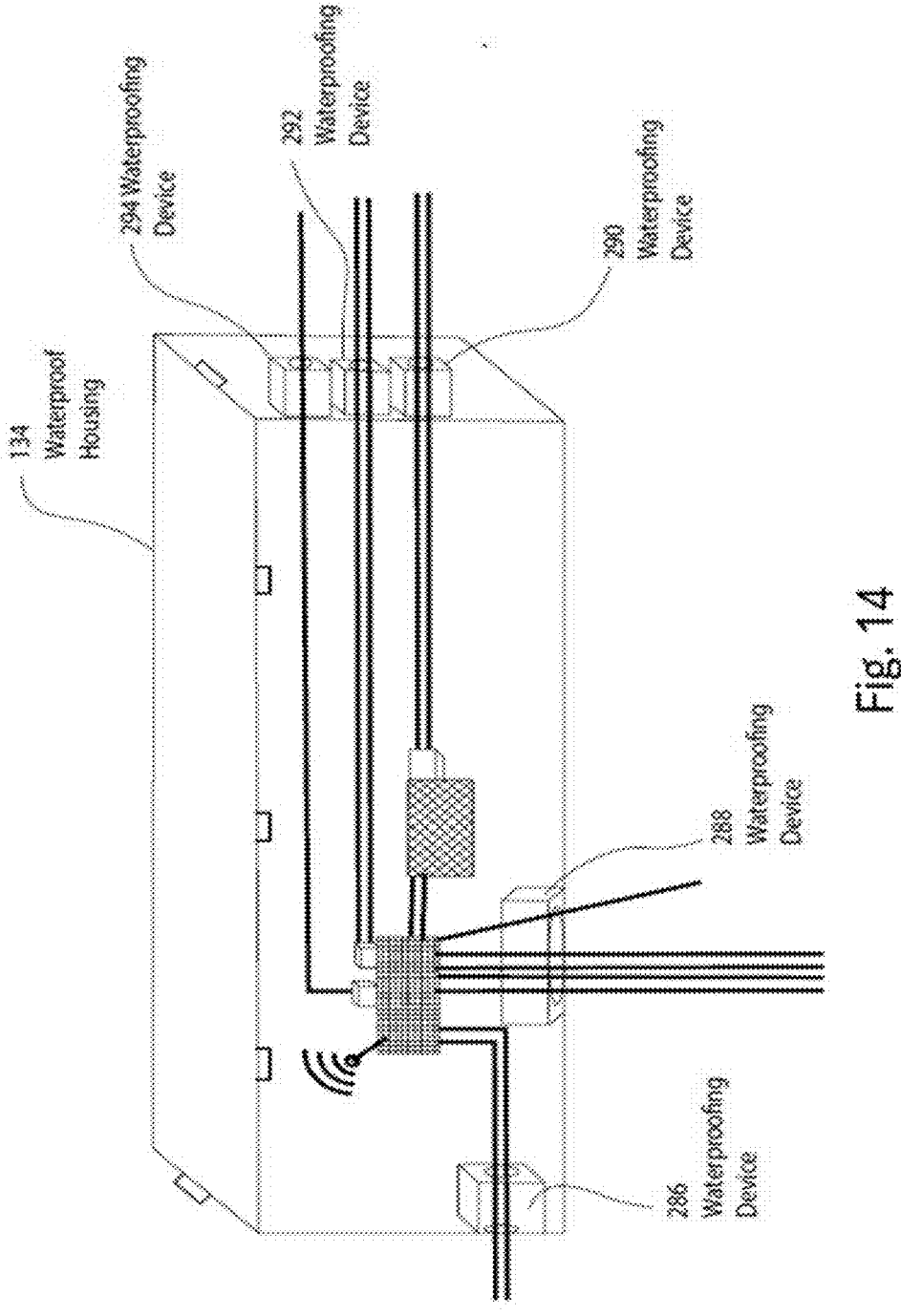
FIG. 14 is an isometric view of delivery system controller of FIG. 2.

FIG. 14 is similar to FIG. 13 and further illustrating waterproofing devices 286-294 providing waterproofing for waterproof housing 134.

Figure 15:
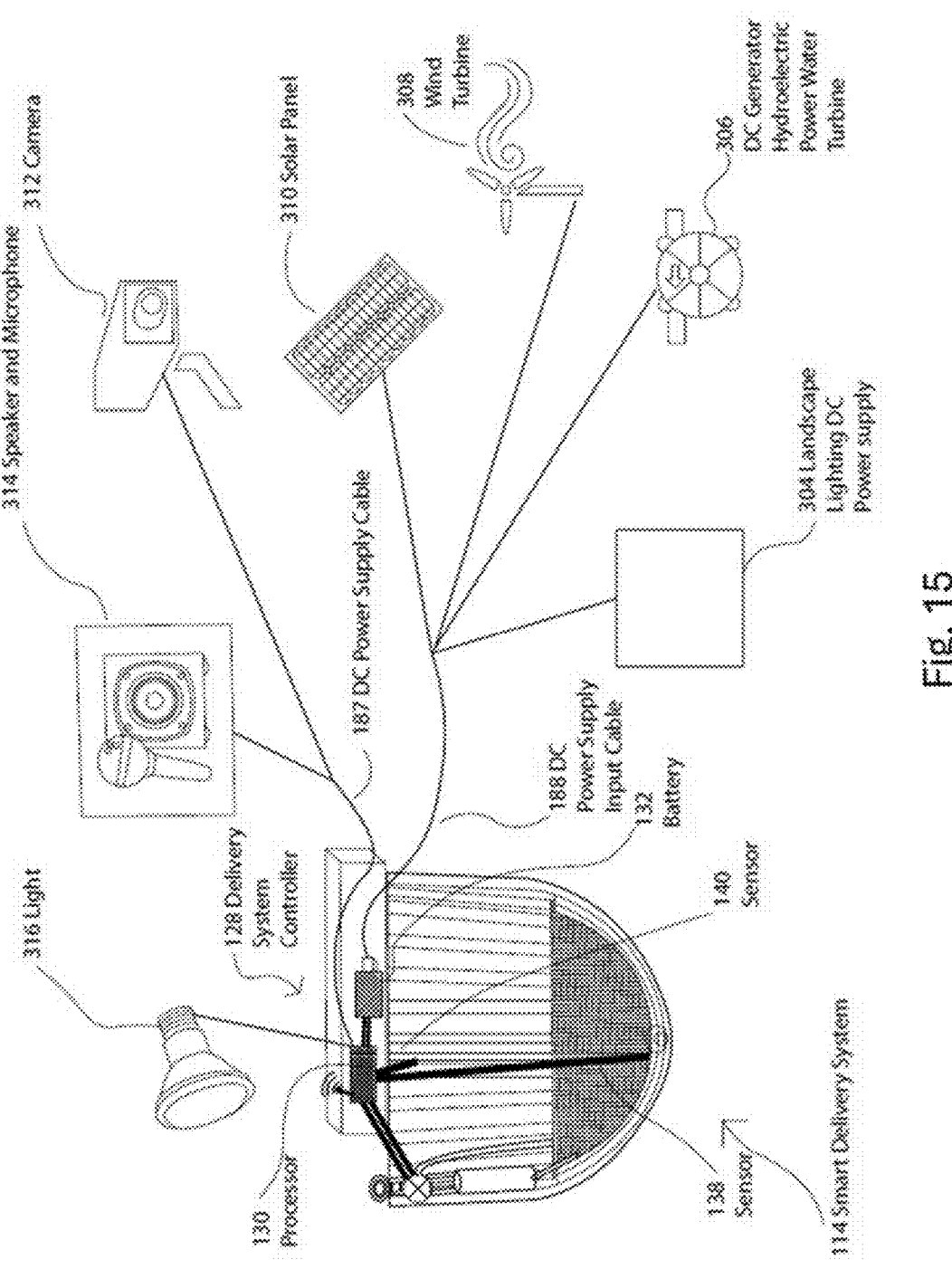
FIG. 15 is an isometric view of FIG. 4 and showing external devices.

FIG. 15 illustrates devices that can be connected to the delivery system controller 128 of smart delivery system 114. Solar panel 310, wind turbine 308, DC generator hydroelectric power water turbine 306 that uses the flow of water through a turbine to generate electricity, and landscape lighting DC power supply 304 are examples of devices that can be connected to DC power supply input cable 188 and used to provide power and recharge battery 132. An example of a DC generator hydroelectric power water turbine 306 is a Yosoo-Water Generator006 manufactured by Yosoo, although similar devices may be used as known in the art. An example of a landscape lighting DC power supply 304 is Harbor Breeze 120-Watt Multi-Tap Landscape Lighting Transformer with Digital Timer Model #8201080399-2, although similar power pack devices may be used as known in the art. Additionally, external devices can be connected to the delivery system controller 128 that provide additional features. Light 316 can be connected to processor 130 and if the main control system 108 (FIG. 1) or the delivery system controller determines that a plant needs additional light, the processor 130 can turn on and off light 316 as determined by the communication between smart delivery system 114 and main control system 108 (FIG. 1). Additionally, a speaker and microphone 314 can be used to send and receive sound. Speaker and microphone 314 can be connected to the DC power supply cable 187 and play a sound when processor 130 detects certain conditions exist. For example, if the processor determines that an animal is urinating on the plant 102-106 (FIG. 1), the processor 130 can direct speaker 314 to make noise so the animal is alerted and scared away. Additionally, camera 312 can be connected to the DC power supply cable 187 and either live stream or record plant 102-106 (FIG. 1) which can be continuously, or under certain conditions. For example, a user may find it advantageous to monitor each plant using computer device 156 (FIG. 2) when desired. The processor 130 may also automatically turn on camera 312 and record when certain conditions exist. For example, if a certain amount of pressure is exerted on soil 112 (FIG. 1) could indicate a passerby digging up the plant, as a non-limiting example.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A smart plant monitoring and delivery system comprising:

at least one smart delivery system comprising:
    a root monitoring and delivery system and a delivery system controller, said root monitoring and delivery system comprising:
    a housing comprising:
        a top, a bottom, an exterior side, and a root side so that said root side is separated from said exterior side by a width defining an internal chamber, and said exterior side extending from said top to said bottom, and said root side having a sidewall that extends from said top to a bottom of said sidewall, and said bottom of sidewall extends in a lateral direction towards said exterior side;
        mesh located on said root side and connected to said bottom of said sidewall and separated laterally from said exterior side by said width and defining an aeration chamber, said mesh extending from said bottom of said sidewall to an inner bottom wall of said housing, and said internal bottom wall extends in a lateral direction from said root side;
        a bottom sidewall on said root side that extends below said mesh;
        a housing extension that extends laterally from said bottom sidewall;
        a protruding lip that extends in a vertical direction from said housing extension so that said housing extension defines a lateral groove between said protruding lip and said bottom sidewall;
        an irrigation drip nozzle having a water intake end and a delivery end, said delivery end disposed through said top of said housing in an irrigation drip channel located between said sidewall of said root side of housing and said exterior side of said housing;
        a water control valve;

a water delivery tube connected to said valve;

at least one signal transmission cable connected to said valve;

at least one sensor;

said delivery system controller comprising:

a battery;

a processor that is powered by said battery, and said processor is connected to said at least one sensor, and said at least one signal transmission cable is connected to said processor, and said at least one signal transmission cable is configured to send signals from said processor to said water control valve and said signals are configured to turn on and off said water control valve;

a waterproof housing that contains said processor and said battery;

a main control system configured to wirelessly communicate with said smart delivery system, and said main control system comprising:

a computer device;

a controller configured to wirelessly communicate with said computer device and said delivery system controller, so that said controller is configured to control said water central valve, and said controller is configured to receive information from said sensors and send an alert to said computer device.

2. The smart plant monitoring and delivery system of claim 1 further comprising said main control system having an automated watering system so that said controller is configured to turn off and on said automated watering system.

3. The smart plant monitoring and delivery system of claim 1 further comprising an internet cloud database with integration API (application programming interface), and said computer device having an application connected to a cloud database having individual specific plant data for water/air/light/nutrient needs.

4. The smart plant monitoring and delivery system of claim 1 further comprising said battery is a rechargeable battery and said rechargeable battery is powered by an external power source.

5. The smart plant monitoring and delivery system of claim 1 further comprising said waterproof housing of said delivery system controller has a removable lid so that said waterproof housing is configured to be opened and replace said battery.

6. The smart plant monitoring and delivery system of claim 3 further comprising said external power source is a solar panel.

7. The smart plant monitoring and delivery system of claim 3 further comprising said external power source is a DC generator hydroelectric power water turbine.

8. The smart plant monitoring and delivery system of claim 3 further comprising said external power source is a landscape lighting DC power supply.

9. The smart plant monitoring and delivery system of claim 3 further comprising said external power source is a wind turbine.

10. The smart plant monitoring and delivery system of claim 1 further comprising:

at least one camera that is powered by said processor via at least one DC power supply cable connected to said processor.

11. The smart plant monitoring and delivery system of claim 1 further comprising:

at least one speaker that is powered by said processor via at least one DC power supply cable connected to said processor.

12. The smart plant monitoring and delivery system of claim 1 further comprising:

at least one light that is powered by said processor via at least one DC power supply cable connected to said processor.

13. The smart plant monitoring and delivery system of claim 1 further comprising: said at least one smart delivery system being disposed adjacent roots of a plant planted outside in the ground.

14. The smart plant monitoring and delivery system of claim 1 further comprising: said at least one smart delivery system being disposed adjacent the roots of a plant planted in a pot.

15. The smart plant monitoring and delivery system of claim 1 further comprising a pneumatic moisture indicator disposed in said housing.

16. The smart plant monitoring and delivery system of claim 1 further comprising a moisture wick disposed in a moisture wick channel of said housing.

17. The smart plant monitoring and delivery system of claim 1 further comprising a replaceable nutrients cartridge 168 disposed in said irrigation drip channel of said housing.

18. A method of installing a smart plant monitoring and delivery system comprising:

creating a crescent opening in soil near roots of a plant by inserting a shovel head in said soil and rocking said shovel head in a back and forth motion;

providing a root monitoring and delivery system shaped to fit the contour of said shovel head;

partially lift said shovel head out of said soil in an upwards direction;

pushing a top of said root monitoring and delivery system against a back contour of said shovel while shovel remains in said soil;

inserting said shovel head in a groove located on said root monitoring and delivery system located between a protruding lip and a bottom sidewall of said root monitoring and delivery system while said shovel head and said root monitoring and delivery system remain in said soil;

apply force to said groove with said shovel head until only said top of said root monitoring and delivery system is visible above soil;

providing a delivery system controller having a battery connected to a processor inside of a waterproof housing;

attaching said delivery system controller to said top of said root monitoring and delivery system;

providing a controller independent of and not attached to said delivery system controller or said root monitoring and delivery system;

providing a computer device independent of and not attached to said delivery system controller or said root monitoring and delivery system;

attaching a water supply conduit to a water intake end of an irrigation drip line nozzle.

19. A root monitoring and delivery system comprising:

a housing comprising:

a top, a bottom, an exterior side, and a root side so that said root side is separated from said exterior side by a width defining an internal chamber, and said exterior side extends from said top to said bottom, and said root side having a sidewall that extends from said top to a bottom of said sidewall, and said bottom of sidewall extends in a lateral direction towards said exterior side;

mesh located on said root side and connected to said bottom of said sidewall and separated laterally from said exterior side by said width and defining an aeration chamber, said mesh extending from said bottom of said sidewall to an inner bottom wall of said housing, and said internal bottom wall extends in a lateral direction from said root side;

a bottom sidewall on said root side that extends below said mesh;

a housing extension that extends laterally from said bottom sidewall;

a protruding lip that extends in a vertical direction from said housing extension so that said housing extension defines a lateral groove between said protruding lip and said bottom sidewall;

an irrigation drip nozzle having a water intake end and a delivery end, said delivery end disposed through said top of said housing in an irrigation drip channel located between said sidewall of said root side of housing and said exterior side of said housing.

20. The root monitoring and delivery system of claim 19 further comprising a pneumatic moisture indicator disposed in said housing.

21. The root monitoring and deliver system of claim 19 further comprising a moisture wick disposed in a moisture wick channel of said housing.

22. The root monitoring and delivery system of claim 19 further comprising a replaceable nutrients cartridge disposed in said irrigation drip channel of said housing.

23. A metho of making a root monitoring and delivery system comprising:

forming a housing having a root side and an exterior side separated by a width that forms an internal chamber inside of said housing so that said exterior side extends from a top of said housing to a bottom of said housing, and said root side has a sidewall formed that extends from said top of said housing to a bottom of said sidewall of said housing;

shaping a mesh design in said root side of said housing that extends from said bottom of said sidewall of said root side of said housing to an internal bottom wall of said bottom of said housing;

forming a groove below said mesh and between a bottom sidewall of said root side of said housing and a protruding lip so that said groove is formed by a housing extension that extends laterally away from said bottom sidewall, and said groove is formed at the bottom of said housing;

shaping said root side, and exterior side, said groove and said lip in a curved shape so that said groove, said protruding lip and said root housing are contoured to the shape of a shovel head and said root monitoring and delivery system is shaped to be held by said shovel head.

* * * * *